S. ALLINGTON.
Gate.
No. 21,645.
Patented Oct. 5, 1858.
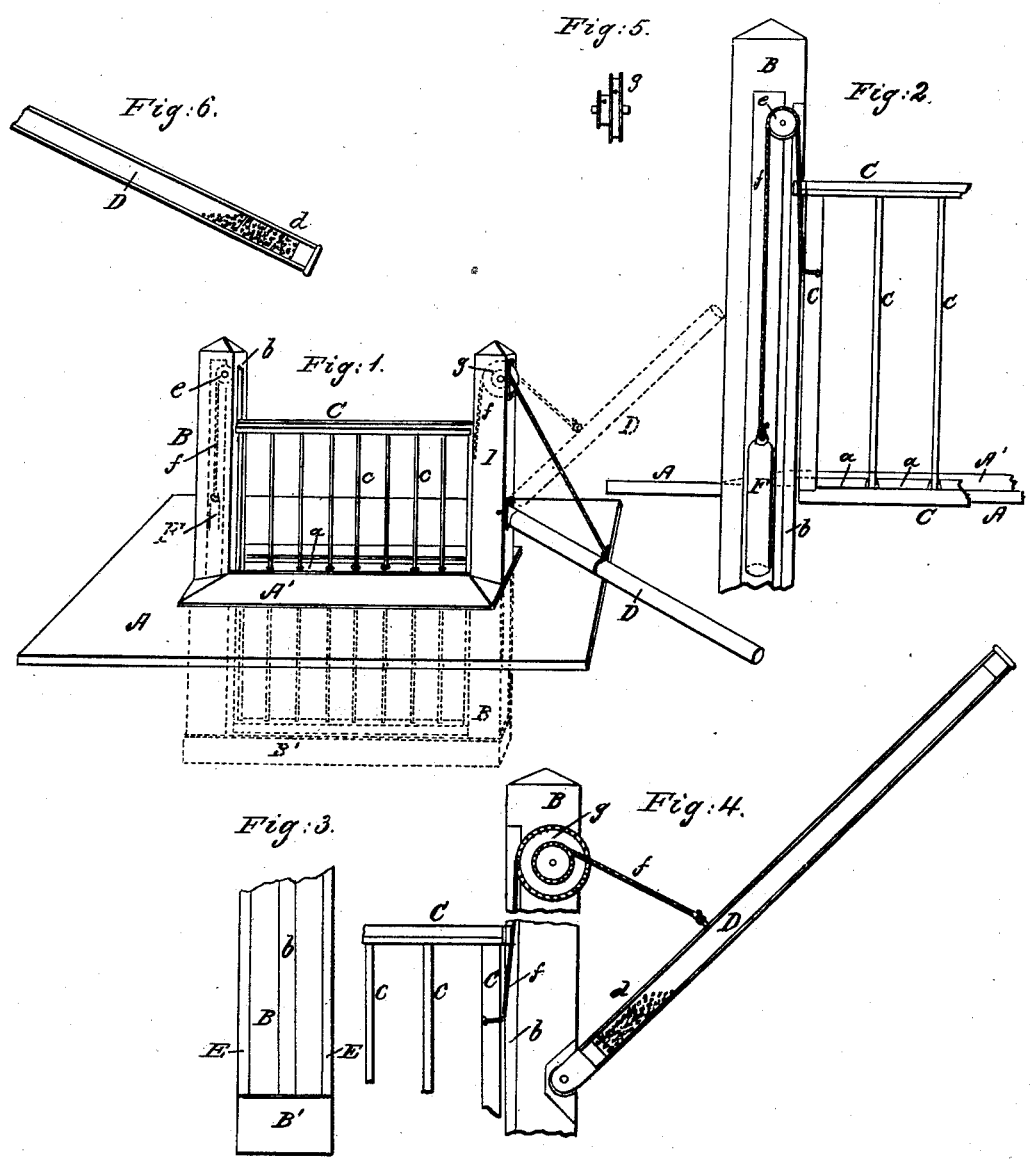

UNITED STATES PATENT OFFICE.

SILAS ALLINGTON, OF WEST DRESDEN, NEW YORK.

GATE.

Specification of Letters Patent No. 21,645, dated October 5, 1858.

*To all whom it may concern:*

Be it known that I, SILAS ALLINGTON, of West Dresden, in the county of Yates and State of New York, have invented a new and useful Gate for a Farm or Dooryard Fence; and I do hereby declare that the following is a full, clear, and exact description of the construction and operation of the same, reference being had to the annexed drawings, making a part of this specification, in which—

Figure 1, is a perspective view of the gate—the full lines showing the gate closed—the dotted lines the gate open. Fig. 2, is a vertical sectional view of one of the posts and part of the gate. Fig. 3, is a transverse sectional view of the bottom of post (which is under the ground) and its bed, or connecting sill. Fig. 4, is a vertical sectional view of one of the posts with the lever, and part of the gate showing the connection of the gate to the lever over the double pulley $g$. Fig. 5, is a section of pulley $g$. Fig. 6, is a section of lever, showing the situation of the weights when the gate is closed.

Similar letters refer to corresponding parts in each figure.

To enable others skilled in the art, to fully understand the construction of my gate, I will describe it as follows.

A, is the platform or surface of the ground.

A′, A′, are beveled or "chamfered" pieces planted on each side of the posts, and serve for making a "berth" for the top rail of the gate to fall into, also to serve as "inclines" for the wheels of vehicles to cross over the top rail of gate, with but little jolt.

$a$, is a cap which is perforated for the "stiles," and "palings," to pass up and down in freely; and also to keep the dirt and water out of the "recess."

B, B, are the gate posts; they are made sufficiently long to run down into the ground deep enough to form a "recess," sufficiently to receive the gate.

B′, is a bed, or connecting "sill," into which the posts are framed.

$b$, $b$, are grooves in the posts for the ends of the "rails" of the gate to slide in.

C, C, is "rails," and "stiles," of the gate.

$c$, $c$, are the "palings."

D, is a hollow lever in which are placed the globular shaped weights $d$; and in which they (the weights) move freely from one end to the other, as the lever is "tilted" when opening, or closing, the gate.

E, E, are planks spiked on to the sides of the posts (below the surface of the ground) to form a water tight "recess" for the gate to drop into in opening it.

F, is a weight, or counterbalance to the gate, it is a few pounds less in weight than the gate.

$f$, $f$, are cords or chains connecting the weight, and lever to the gate.

$g$, is a double pulley, to which are attached the cords ($f$, $f$,) from the gate, and lever, the pulley is made of different diameters to obtain the desired "travel," or "throw," of the lever.

To use, or open and close, my gate, the lever D, is thrown a little above, or below, a horizontal position, when the globular weights $d$, roll out, or in, and by thus shifting the weight to the outer, or inner end of the lever, cause the gate to be shut, or opened; and when opened, or shut, the difference of the power (weight) on the lever will cause it to stay in that position until again operated upon. To open or shut it from a vehicle we have only to attach "pull cords" to the lever D, and lead them off to the "gallows posts" as are commonly used.

What I claim and desire to secure by Letters Patent is

The lever D, with its self shifting weights, and its connection to the gate in the manner set forth.

SILAS $\overset{\text{his}}{\times}$ ALLINGTON.
<div style="text-align:center">mark</div>

Witnesses:
    A. R. McLEAN,
    CALEB GOUNDRY.